UNITED STATES PATENT OFFICE.

CHARLES F. BLACKKETTER, OF MINNEAPOLIS, MINNESOTA.

WOOD STAIN AND FILLER.

1,316,674.   Specification of Letters Patent.   Patented Sept. 23, 1919.

No Drawing.   Application filed February 8, 1919. Serial No. 275,868.

*To all whom it may concern:*

Be it known that I, CHARLES F. BLACKKETTER, a citizen of the United States, residing at Minneapolis, in the county of Hennepin and State of Minnesota, have invented certain new and useful Improvements in Wood Stains and Fillers; and I do hereby declare the following to be a full, clear, and exact description of the invention, such as will enable others skilled in the art to which it appertains to make and use the same.

My invention has for its object to provide a highly efficient combined transparent wood stain and filler which will combine all of the good results hitherto attained by several distinct operations.

Hitherto, to obtain a high grade job of staining and filling of wood, it has been necessary, first, to sponge the wood, then apply the stain, next to apply the filler and then give the same a coat of shellac. After these operations, the wood thus treated would be sandpapered and the varnish could then be applied. In applying the stain, as above described, to thin veneers, there is always a great danger of loosening up the veneer, and moreover, the several operations require considerable time, and, consequently, high cost.

My invention provides a composition in the nature of an emulsion which may be applied by one operation and which will effect the staining and filling and the hardening operation required in former processes, by the action of the shellac.

This improved combined stain and filler comprises a substance being preferably an anilin dye dissolved in alcohol, some times designated as "spirit soluble dye"; a filler, preferably floated silicate, such as that known to the trade as the "Bridgeport filler"; and a varnish.

When ground or powdered silicate is placed in water the lighter or finer particles will float on the surface and may be skimmed off and separated from the heavier particles which drop to the bottom. This lighter portion of the silicate is known as floated silicate. I have obtained the best result by use of the varnish known to the trade as gold cross brand varnish. This varnish contains linseed oil, china-wood oil, rosin and Zanzibar gum.

Commercially, I have made the above combined stain and filler as follows:

For one gallon thereof, sixty ounces of denatured alcohol, four ounces of spirit soluble anilin dye, fifty six ounces of floated silicate, twenty eight ounces of varnish, twenty ounces of kerosene, benzin or gasolene. These ingredients do not produce chemical reaction but form an emulsion with the dye held in solution by the alcohol, this latter feature being highly important. In using this emulsion it is not necessary first to treat the surface of the wood in any way, except, of course, to provide the same with the desired finish, such as sand papering where a smooth surface is desired. The sponging of the wood found necessary in the multi-step process, hitherto employed, is not here necessary or desirable.

When the emulsion is applied to the wood, the alcohol will be absorbed almost instantly by the wood and the dye or stain will be carried with it into the wood, giving a uniform color to the finished surface, and bring out the silky sheen of the wood. After the applied emulsion has remained on the wood for a few minutes and has formed a sort of a paste, the surplus material is rubbed off by a well known operation which will rub into the grain of the wood, the desired amount of the filler. After this rubbed surface has stood about twenty-four hours, more or less, it is ready for other coats of varnish, if a varnished surface is desired. However, the varnish and the silicates of the emulsion when they have hardened, in themselves, give a hard finished surface which will be impervious to water and give a good final finish, but which finish, where further coats of varnish are desired, forms the best kind of a base for the subsequent coats of varnish, and moreover, makes necessary the use of fewer coats of varnish than will be required where the wood surface is prepared by the old multi-step process.

In fact, I have found that not only can time and labor, representing money, be saved by the use of this improved combined stain and filler, but that a better job can be produced.

This emulsion contains no moisture or liquid that will loosen the glue of the thinnest veneers. The alcohol will not cut the glue and, furthermore, is quickly absorbed and evaporated. The kerosene, or similar hydrocarbon, cuts and thins the varnish and makes the emulsion easy to spread and wipe.

It will be understood that, instead of the ingredients above named, any chemical equivalent may be substituted therefor.

What I claim is:

1. A combined wood stain and filler in the form of an emulsion containing a spirit soluble dye, an insoluble silicate filler, and varnish.

2. A combined wood stain and filler in the form of an emulsion containing a spirit soluble dye, an insoluble floated silicate filler, and varnish, and an alcohol thinner.

3. A combined wood stain and filler in the form of an emulsion consisting of alcohol, a dye, held in a solution in the alcohol, an insoluble silicate filler, a varnish, and a hydrocarbon thinner.

In testimony whereof I affix my signature in presence of two witnesses.

CHARLES F. BLACKKETTER.

Witnesses:
H. D. KILGORE,
B. G. BAUMANN.